(No Model.)

H. C. EAKIN.
CLOTHES LINE.

No. 590,971. Patented Oct. 5, 1897.

WITNESSES
J. K. Gray
C. D. Kesler

INVENTOR
Hort C. Eakin.
By John Wedderburn
Attorney

UNITED STATES PATENT OFFICE.

HORT C. EAKIN, OF DALLAS, OREGON.

CLOTHES-LINE.

SPECIFICATION forming part of Letters Patent No. 590,971, dated October 5, 1897.

Application filed January 9, 1897. Serial No. 618,543. (No model.)

*To all whom it may concern:*

Be it known that I, HORT C. EAKIN, a citizen of the United States, residing at Dallas, in the county of Polk and State of Oregon, have invented certain new and useful Improvements in Clothes-Lines; and I do hereby declare the following to be a full, clear, and exact description of the invention, such as will enable others skilled in the art to which it appertains to make and use the same.

My invention relates to clothes-lines; and its object is to provide an improved form of clothes-line which may be operated from one end and adjusted to suit varying conditions of tension.

My invention consists of certain novel features of construction hereinafter described and claimed.

Figure 1:
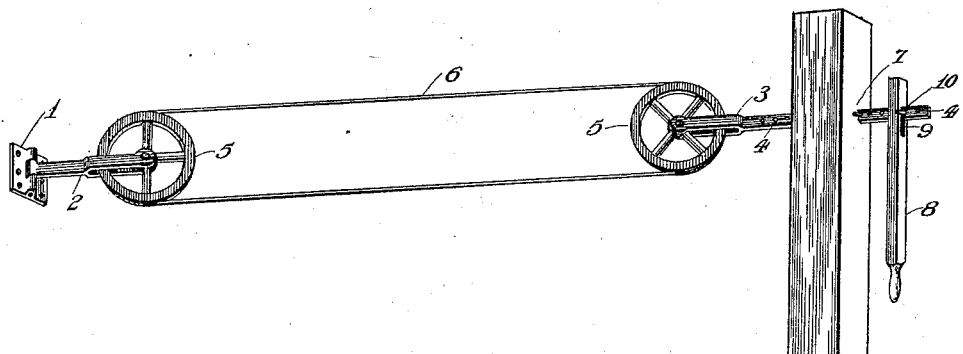
Figure 2:
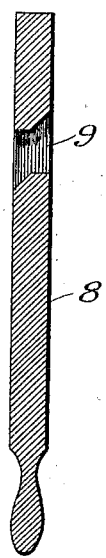

In the accompanying drawings, Figure 1 is a perspective view of my device, and Fig. 2 is a detail sectional view of my adjusting-lever.

The numeral 1 indicates a hinge, to which is attached a pulley-fork 2. At the other end of my line is a pulley-fork 3, which I preferably form with a reduced end and provide with a series of openings 4, extending therethrough. Sheaves 5 are mounted in these pulley-forks, and around these sheaves extends a line 6.

In the usual application of my invention the hinge 1 is attached to a wall or a fence and the reduced end of the pulley-fork 3 extends through a post, as shown, being held therein by a pin 7. It is plain that by pulling the end of the pulley-fork 3 through the post tension may be exerted on the line 6, and it is plain that this tension may be held by means of the pin 7 being passed through that one of the openings 4 which is closest to the post. In order to effect this tension, I provide a lever 8, having an angled opening 9, through which passes the shank of the pulley-fork 3, and the lever is retained thereon by a pin 10, similar to pin 7. It is now plain that by pulling upon the handle of the lever the shank of the pulley-fork 3 may be drawn through the post, the pin 7 inserted in the proper hole, and the handle released, when the line will be held in tension. If it is desired to exert a greater tension, the lever 8 may be moved up toward the post, the pin 10 withdrawn and replaced in one of the holes nearer the post, and the former operation repeated.

I thus provide a simple and efficient device of the character described that may be manufactured at a low cost and is of such nature as to require little or no repairs.

Having thus described my invention, what I claim as new, and desire to secure by Letters Patent, is—

1. The combination with a pulley-fork having a shank provided with a series of openings therethrough, of a pulley-wheel held within said fork, a standard through which said shank is adapted to pass, a pin held in one of said openings and adapted to retain said shank in said standard, a lever having an opening therethrough held upon said shank, and a pin held in one of said openings and adapted to form the bearing-point of said lever.

2. The combination with a hinge adapted to be attached to any suitable supporting-surface, of a pulley-fork attached thereto, a pulley held within said fork, a standard having an opening therethrough, a pulley-fork having a shank provided with a series of holes, said shank held normally within the opening in said standard, a pulley located within said fork, an endless rope passing around said pulleys, a lever having an opening therethrough through which extends the shank of the pulley-fork, a pin held within one of said holes adapted to form the bearing-point for said lever, and a second pin adapted to be held within one of said holes and retain the shank in the position to which it may be thrown by said lever.

In testimony whereof I have signed this specification in the presence of two subscribing witnesses.

HORT C. EAKIN.

Witnesses:
DOC P. PATTERSON,
E. HAYTER.